United States Patent [19]
Bullock et al.

[11] Patent Number: 5,954,010
[45] Date of Patent: Sep. 21, 1999

[54] TEMPERATURE SENSING DEVICE FOR PERMANENTLY INDICATING WHEN A PRODUCT IS EXPOSED TO CRITICAL TEMPERATURES

[75] Inventors: Norma Kathryn Bullock; Roy Kuipers, both of Rockwall, Tex.

[73] Assignee: Lucent Technologies Inc., Murray Hill, N.J.

[21] Appl. No.: 08/716,117

[22] Filed: Sep. 19, 1996

[51] Int. Cl.⁶ .................................................. G01K 11/06
[52] U.S. Cl. ........................................... 116/217; 374/106
[58] Field of Search ................................... 374/106, 102, 374/187; 116/217, 218, 219

[56] References Cited

U.S. PATENT DOCUMENTS

| | | | |
|---|---|---|---|
| 1,345,767 | 7/1920 | Hammond | 116/217 |
| 1,788,794 | 1/1931 | Harris | 116/106 X |
| 2,277,533 | 3/1942 | Thompson | 116/217 X |
| 3,268,345 | 8/1966 | Kennedy, Jr. | 116/102 X |
| 3,533,291 | 10/1970 | Steele et al. | 374/106 |
| 3,724,360 | 4/1973 | Kliewer et al. | 116/217 X |
| 5,482,000 | 1/1996 | Ward | 116/217 |

FOREIGN PATENT DOCUMENTS 2 120 795  12/1983  United Kingdom ................ 116/212

*Primary Examiner*—Richard Chilcot
*Assistant Examiner*—Willie Morris Worth

[57] ABSTRACT

A temperature sensing device for permanently indicating when a product is exposed to ambient temperatures exceeding a maximum permitted temperature of the product for a time period long enough to permanently damage the product. In an exemplary embodiment, the temperature sensing device is typically located on the protective cover of a battery away from terminals and the battery casing. The temperature sensing device is made of a material to permanently expand and/or shrink upon reaching critical temperatures (e.g. too hot). The expansion is visually detectable by means of a visual indicator and/or reference point.

5 Claims, 5 Drawing Sheets

TEMPERATURE SENSING DEVICE FOR PERMANENTLY INDICATING WHEN A PRODUCT IS EXPOSED TO CRITICAL TEMPERATURES

FIELD OF THE INVENTION

The present invention relates generally to temperature detectors, and more specifically, to temperature sensing devices for electronics, power systems and batteries.

BACKGROUND OF THE INVENTION

Products (such as computers, electronic components, power systems, batteries and other related products) are often located in hostile environments and may be exposed to excessively hot temperatures. Specifically, for example, when a battery is exposed to temperatures beyond its designed upper limit, the battery will fail. Battery manufacturers often direct customers not to expose batteries to temperatures above their limits and will nullify warranty coverage in cases where the battery is exposed to excessive heat. Nevertheless, there is no inexpensive way for the battery manufacturer to readily ascertain and prove to a customer with convincing evidence when a battery has failed due to exposure to excessive temperatures.

Typically, temperature sensor devices, such as thermocouples and thermisters, are used in outdoor power systems to provide feedback control for voltage or current regulation of battery charging system. Such sensors, however, are commonly placed directly on the battery case or battery post to measure the battery temperature, not the ambient temperature. Since the battery temperature can become higher than the ambient temperature surrounding the battery, it is not possible for a sensor on the battery case or post to measure the atmospheric temperature that the battery is exposed to.

Additionally, such temperature sensor devices measure temperature instantaneously, when in fact, it may take several minutes or even hours of exposure to ambient temperatures above the upper limit of a battery, before it will fail. Moreover, thermocouple and thermister devices do not typically store temperature levels and respective exposure times, due to excessive costs associated with manufacturing such a system. So the battery manufacturer has no permanent sensor device to indicate whether a battery had been exposed to ambient temperatures beyond its upper limit for a period of time long enough to damage the battery.

What is needed, therefore, is an inexpensive and permanent temperature detector that clearly indicates whether a battery has been exposed to excessive temperatures for a period of time beyond the design limit of the battery.

SUMMARY OF THE INVENTION

The present invention is directed to a temperature sensing device for permanently indicating when a product is exposed to temperatures exceeding a maximum permitted temperature of the product for a time period long enough to permanently damage the product. The present invention can be used in any environment where it may be necessary to measure temperatures with a temperature sensing device to provide a permanent indication of a temperature variation.

In an exemplary embodiment, the temperature sensing device is in proximal location to a product (typically relating to computers, electronics, power systems and batteries, but not necessarily limited to such products). The device includes an indicator having a first defined shape over a range of temperatures less than a maximum exposure temperature of the product and a permanent second defined shape, when the indicator is exposed to temperatures greater than the maximum exposure temperature of the product for a period of time.

In a second exemplary embodiment, the indicator is in close proximity to a product. The indicator has a first set of shapes over a range of temperatures below the maximum permitted temperature of the product. It has second set of expanded shapes beyond a reference point in close proximity to the indicator, when the product is exposed to temperatures exceeding the maximum permitted temperature and for a time period long enough to permanently damage the product. The indicator will remain expanded beyond the reference point, even if said product is later exposed to reduced temperatures below the maximum permitted temperature.

In another exemplary embodiment, the indicator, is positioned in a slot of a product cover. In this case, the indicator contracts in size as said product is exposed to increases in temperature. The indicator will become separated from the slot when the product is exposed to temperatures exceeding the maximum permitted temperature by contracting to a dimension smaller than the slot.

Still in another exemplary embodiment, the device includes a washer and a device for fastening the washer to a cover of the product. The washer has a first diameter over a range of temperatures below the maximum permitted temperature of the product. The washer will creep beyond a second diameter and permanently distort at a temperature above the maximum permitted temperature.

Other embodiments, features and advantages of the present invention will become apparent after reading the foregoing description.

DETAILED DESCRIPTION OF THE INVENTION

Figure 1:
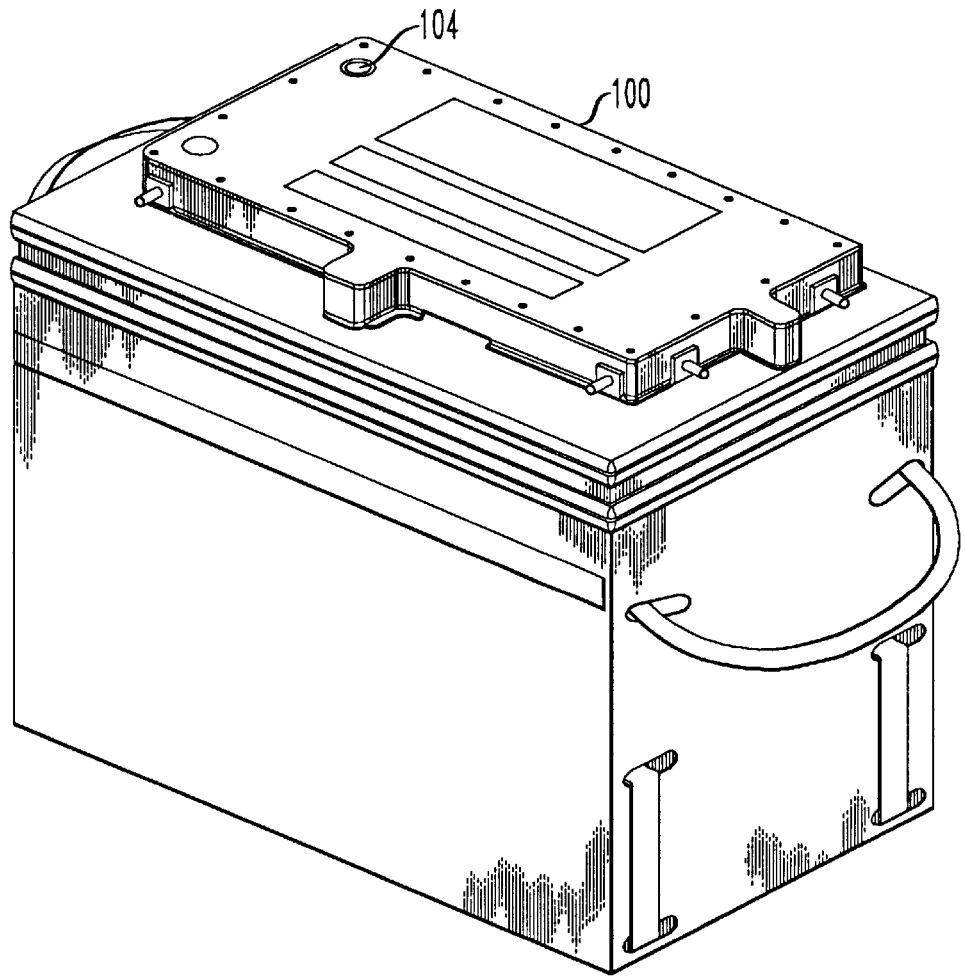
FIG. 1 illustrates a temperature sensing device for permanently indicating when a battery is exposed to ambient temperatures exceeding a maximum permitted temperature of the battery for a time period long enough to permanently damage the battery, according to an exemplary embodiment of the present invention.

FIG. 1 illustrates a temperature sensing device 104 for permanently indicating when battery (inside the protective cover 100) is exposed to ambient temperatures exceeding a maximum permitted temperature of the battery for a time period long enough to permanently damage the battery, according to an embodiment of the present invention. It is preferred that the temperature sensing device 104 be located on the protective cover 100 of a battery away from connecting bus bars, lead terminals and the battery casing. The temperature sensing device 104 is made of materials (to be described) to permanently expand and/or shrink upon reaching critical temperatures (e.g. too hot). The expansion is visually detectable by means of a visual indicator and/or reference point.

Typically, protective covers 100 are made of an insulating plastic material and have an insulating layer of air between the a top cover the casing of the battery (not shown) and the protective cover 100. This layer of air space insulates the temperature sensing device 104 from the internal battery temperature and is more reflective of ambient temperature. It is contemplated that the device 104 could be placed on the sides or bottom of the cover 100. It is not recommended to attach the device 104 directly to the battery case.

It is also envisioned that the temperature sensing device 104 could be used to measure temperatures of general products and devices other than batteries and power systems. For example, the temperature sensing device 104 could be used to measure the temperature inside a computer cabinet to indicate whether internal elements within the cabinet are exposed to excessive ambient temperatures.

Figure 2:
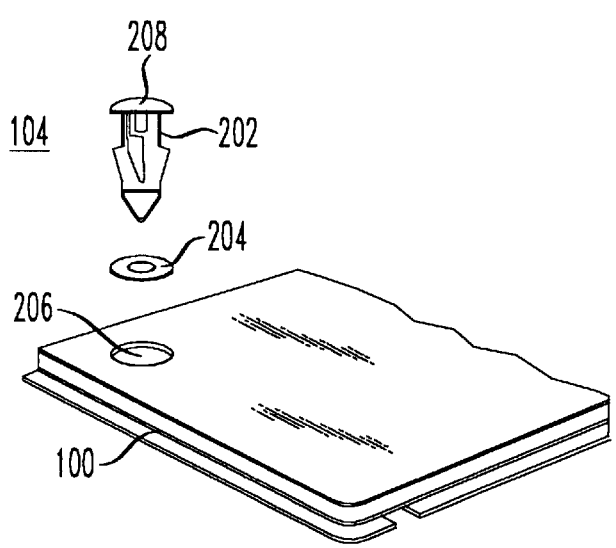
FIG. 2 shows an exploded view of a general temperature sensing device according to an exemplary embodiment of the present invention.

FIG. 2 shows an exploded view of a general temperature sensing device 104 according to an exemplary embodiment of the present invention. The temperature sensing device 104 includes a fastener 202 and a washer 204. As will be described below, the head 208 of the fastener or the washer 204 can function as a permanent indicator, depending on the type of materials selected for the head 208 of the fastener 202 or the washer 204. In other words, either the fastener 202 or washer 204 can be designed to creep (expand) or shrink and permanently distort at temperatures beyond recommended ambient temperatures of the battery.

In an exemplary embodiment, the fastening device 202 together with the washer 204 is configured to fit securely in a slot 206 of the protective case 100. For the discussion purposes, examples of the washer 204 operating as the indicator shall be described first.

Figure 3:
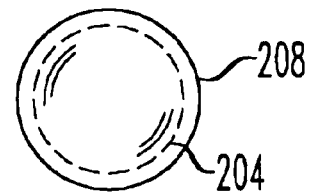
FIG. 3 is a top view of an exemplary embodiment of a temperature sensing device where a washer operates as the indicator, according to the present invention.

FIG. 3 is a top view of an exemplary embodiment of a temperature sensing device 104 where the washer 204 (shown as a dashed line) operates as the indicator. The washer 204 is held under continuous force by a head 208 of the fastening device 202, such as a screw, which is made of a material less sensitive to creep and distortion at high temperatures than the washer 204. The washer 204 should be made of a material which will, in fact, creep and permanently distort at a temperature just above the maximum temperature of the power system device. Preferably, the material should permanently expand only after being exposed to temperatures above the upper limit for a period long enough to damage the battery.

For instance, the washer 204 could be composed of a material from the family of polymer materials, because polymers have a glass transition temperature. An example polymer material suitable for the washer 204 is Polyvinyl Chloride which has a glass transition temperature of about 160 degrees Fahrenheit and is generally beyond the upper temperature limit of most batteries. Of course, other polymers with lower or higher glass transition temperatures could be chosen to match the battery design.

Figure 4:
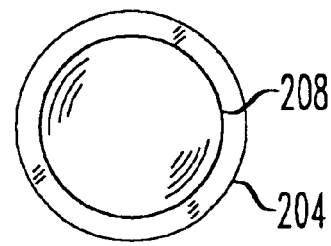
FIG. 4 is a top view of an exemplary embodiment of a temperature sensing device where a washer operates as the indicator and is expanded to a size larger than a head of a fastening device, according to the present invention.

Referring to FIG. 3, the size of the washer 204 should be adjusted to be of a smaller circumference than the head 208 so that when the washer expands because of an excessive ambient temperature, it will expand to a size larger than the head 208 and will become visible as indicated in FIG. 4. It may be preferable, to increase the visibility of the washer 204, by making it a different color than the head 208. It is also contemplated to have a ring encircle the washer 204, with a circumference larger than the washer 204 instead of using the head 208 of the fastening device 202 as the reference point to gauge when the washer 204 has expanded. An embodiment showing rings with and expandable head 208 shall be described below with reference to FIG. 5.

The washer 204 is approximately $\frac{1}{16}$" thickness and held in place by the head 208 of the fastening device 202. Varying levels of torque can be applied to the fastening devices, but is not desired to increase the torque level to a point that may deform the washer 204 without excessive heat present.

As mentioned above the fastening device 202 can also be employed as an indicator. In this example, referring to FIG. 2, it is preferred that the head 208 of the fastener 202 have a circular shape with a slightly conical form such that the material on the edges of the head 208 are thinner than the material toward center of the head 208. The material selected for the head 208 should have thermal properties to expand as the ambient temperature surrounding the protective case 100 nears the upper limits of the battery design parameter. If the ambient temperature exceeds the upper temperature limit of the battery for a period of time long enough to damage a particular battery, then the head 208 will soften and creep to a point where the head 208 will not contract to its original form as the temperature decreases. It should be noted that the head 208 can be other shapes such as square or rectangle. To understand the operation of the fastening device 202 as an indicator reference is made to FIG. 5.

Figure 5:
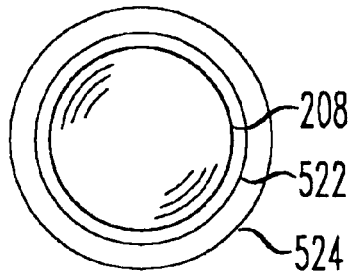
FIG. 5 shows a top view of a head of the fastening device, which is surrounded by inner and outer indicating rings according to an exemplary embodiment of the present invention.

FIG. 5 shows a top view of the head 208 of the fastening device 202, which is surrounded by inner and outer indicating rings 522, 524, respectively. The rings 522, 524 may be molded or printed on top of battery protective cover 100. As the material of the head 208 softens and then melts at the desired temperature, the head 208 will expand. This expansion can be visually detected by the indicating rings 522, 524. Once the glass transition of the material is reached (as in the case of polymer as described above with reference to using the washer 204 above), the head 208 will permanently expand to the size of the outer indicating ring 524, indicating that too high an ambient temperature was reached. The inner ring 522 can be used to indicate softening and expansion of the head 208 at a high temperature below the glass transition temperature to provide a visual warning that the ambient temperature is reaching an excessive level.

Figure 6:
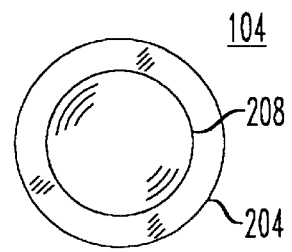
FIGS. 6 and 7 show top views of example temperature sensor devices where a head of a fastening device operates as an indicator, (e.g., the head expands).
Figure 7:
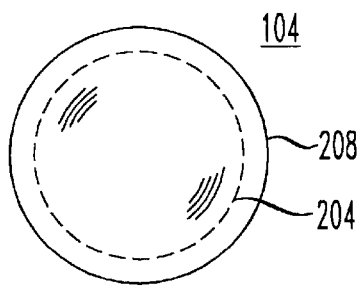

FIGS. 6 and 7 show top views of example temperature sensor devices 104 where the head 208 of the fastening device 202 expands. FIG. 6 shows the head 208 of the fastening device 202 with a circumference less than the diameter of the washer 204, which typically indicates that the battery is being exposed to a range of temperatures less than the maximum designed exposure temperature of the battery.

Referring to FIG. 7, when the temperature exceeds the maximum designed exposure temperature of the battery for a period of time long enough to damage the battery, then the circumference of the head 208 will expand from its original shape to a permanent shape beyond the outer circle of the washer 204, shown as a dashed line in FIG. 7. Thus, the washer 204 acts as a reference point for which to gauge the expansion of the head 208 and indicate whether a battery has been exposed to temperatures exceeding recommended levels.

Figure 8:
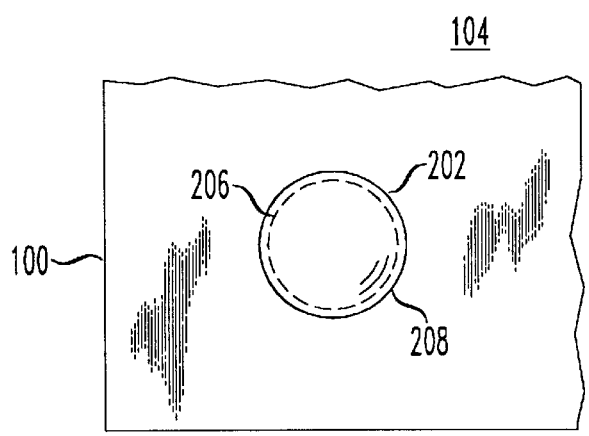
FIGS. 8 and 9 illustrate top views of an another exemplary embodiment of a temperature sensing device shrinking in size when a battery is exposed to temperatures exceeding the maximum permitted temperature, according to the present invention.
Figure 9:
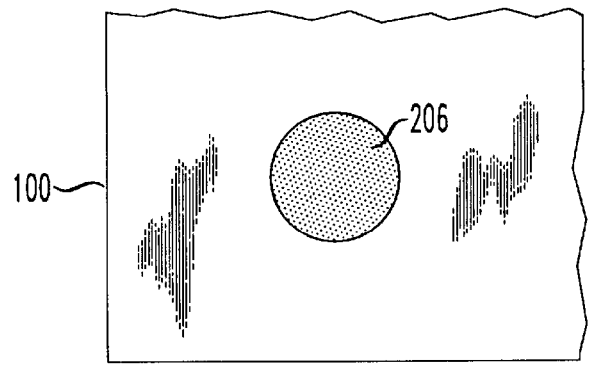
Figure 10:
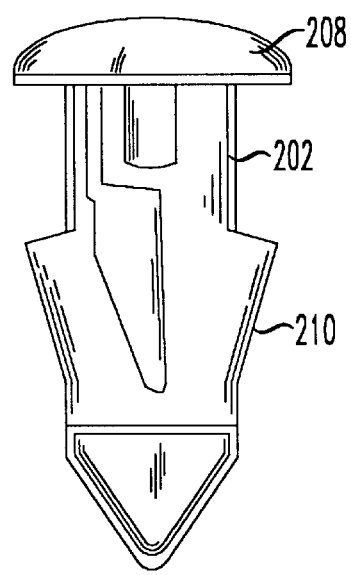
FIGS. 10–14 show various examples of fastening devices that may be used in accordance with the present invention.
Figure 11:
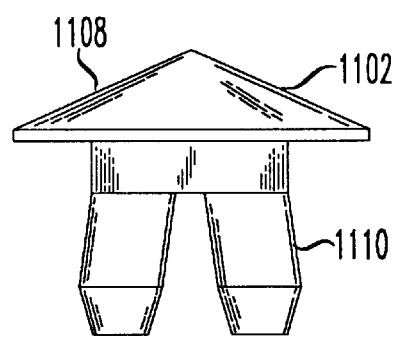
Figure 12:
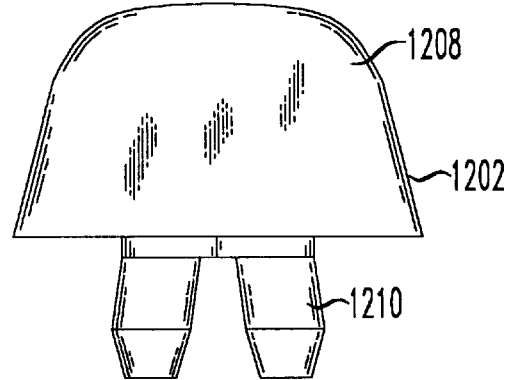
Figure 13:
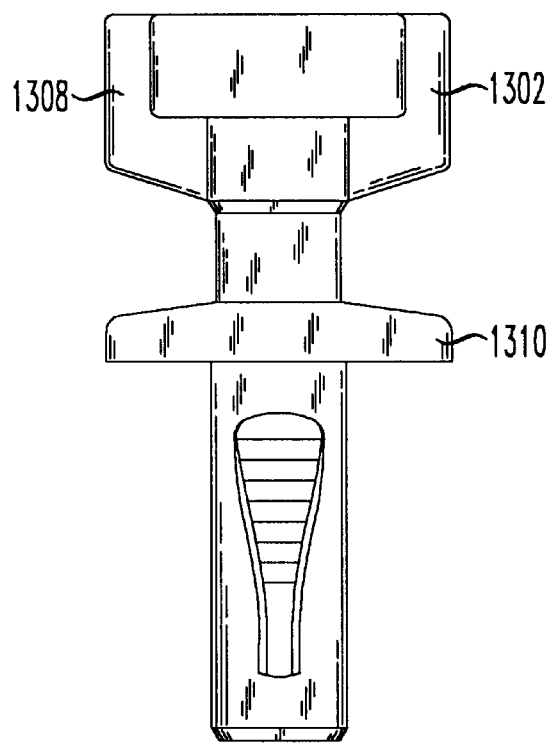
Figure 14:
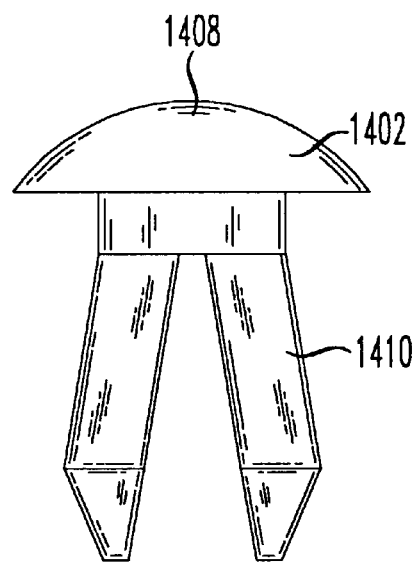

FIGS. 8 and 9 illustrate top views of an another exemplary embodiment of a temperature sensing device 104 that permanently changes in size indicating when a battery is exposed to temperatures exceeding the maximum permitted temperature of a particular battery for a time period long enough to permanently damage the battery. Referring to FIG. 8, the fastening device 202, is positioned to fit in the slot 206 (shown as a dashed line) of the protective cover 100. Additionally, the head 208 overlaps slightly over the edges of slot 206. In this exemplary embodiment, the head and/or fastening device 202, 208 is made from a material that contracts in size as there is an increase in temperature.

Thus, referring to FIG. 9 the head 208 will shrink smaller than the circumference of the slot 206 and will become separated from the slot 206. Ideally, the indicator will separate from the protective cover 100 and pull-out or fall through the slot 206 when the battery is exposed to ambient temperatures exceeding the maximum permitted temperature. The fastening device 202 can be selected from a family of ceramic materials such as zirconium tungstate, which contracts uniformly in all three dimensions on heating up to its decomposition temperature of 777 degrees Celsius. Of course, it is envisioned that other materials can be selected to optimally shrink upon heating-up to indicate when a battery has been exposed beyond a certain temperature level. It should be noted that it is not necessary to have a washer nor is it necessary to have a head 208, if the fastening device is held snug enough in the slot 206 when the ambient temperature is below a product's threshold temperature.

FIGS. 10–14 shows examples of different types of fastening devices 202, 1102, 1202, 1302, and 1402. It should be noted that the bodies 210, 1110, 1210, 1310, and 1410 of fastening devices 202, 1102, 1202, 1302, and 1402, can be made of different materials than their respective heads 208, 1108, 1208, 1308, and 1408.

It should be noted that the device 104 does not have to be in the form of a fastener device and/or washer, but could be in the form of a button without having to pass through the cover 100, eliminating the need for a slot 206 which is shown in FIGS. 2, 8 and 9.

While preferred embodiments have been set forth, various modifications, alterations, and changes may be made without departing from the spirit and scope of the present invention as defined in the specification and in the appended claims.

What is claimed is:

1. A temperature sensing device for permanently indicating when a product is exposed to temperatures exceeding a maximum permitted temperature of said product for a time period long enough to permanently damage said product, wherein said temperature sensing device is attached to a cover of said product, said device comprising:

a washer; and means for fastening said washer to said cover of said product;

wherein said washer has a first diameter over a range of temperatures below said maximum permitted temperature of said product and wherein said washer will creep beyond a second diameter and permanently distort at a temperature above said maximum permitted temperature and wherein said means for fastening said washer has a head having a a diameter greater than said first diameter and smaller than said second diameter.

2. The temperature sensing device of claim 1, wherein said washer is thermoplastic material.

3. The temperature sensing device of claim 1, wherein said means for fastening said washer is a screw.

4. The temperature sensing device of claim 1, wherein said means for fastening said washer is a rivet.

5. The temperature sensing device of claim 1, wherein said product is a battery.

\* \* \* \* \*